(12) United States Patent
Hock et al.

(10) Patent No.: US 6,668,490 B2
(45) Date of Patent: Dec. 30, 2003

(54) LIGHTWEIGHT DOOR FOR MOTOR VEHICLES

(75) Inventors: Michael Hock, Grossostheim (DE);
Stefan Marutschke, Rodgau (DE);
Jürgen Hock, Aschaffenburg (DE);
Vuong Huy, Mühlheim (DE)

(73) Assignee: Wagon Automotive GmbH, Waldaschaff (DE)

( * ) Notice: Subject to any disclaimer, the term of this patent is extended or adjusted under 35 U.S.C. 154(b) by 1 day.

(21) Appl. No.: 10/024,745

(22) Filed: Dec. 19, 2001

(65) Prior Publication Data

US 2002/0078631 A1 Jun. 27, 2002

(30) Foreign Application Priority Data

Dec. 19, 2000 (DE) .......................... 100 03 459

(51) Int. Cl.[7] .............. B60J 5/04; B60J 10/08; E06B 7/16
(52) U.S. Cl. ............... 49/502; 49/475.1; 296/146.9
(58) Field of Search ............... 49/502, 501, 428, 49/414, 415, 416, 419, DIG. 2, 490.1, 440, 441, 475.1, 495.1; 296/146.9, 146.2; 428/99, 122, 492

(56) References Cited

U.S. PATENT DOCUMENTS

| | | | | |
|---|---|---|---|---|
| 4,934,101 A | * | 6/1990 | Hannya et al. | 49/502 |
| 5,024,480 A | * | 6/1991 | Petrelli | 49/485 X |
| 5,107,624 A | * | 4/1992 | Passone | 49/502 |
| 5,163,248 A | * | 11/1992 | Bielis et al. | 49/441 |
| 5,226,259 A | * | 7/1993 | Yamagata et al. | 49/502 |
| 5,317,835 A | * | 6/1994 | Dupuy et al. | 49/441 |
| 5,352,009 A | * | 10/1994 | Takeuchi | 49/490.1 X |
| 5,369,914 A | * | 12/1994 | Takeuchi | 49/495.1 |
| 5,702,148 A | * | 12/1997 | Vaughan et al. | 49/490.1 X |
| 5,743,047 A | * | 4/1998 | Bonne et al. | 49/490.1 |
| 5,806,247 A | * | 9/1998 | Yamamoto | 49/490.1 X |
| 6,039,384 A | * | 3/2000 | Schulte et al. | 296/146.2 |
| 6,099,068 A | * | 8/2000 | Kim | 296/146.9 |
| 6,409,251 B1 | * | 6/2002 | Kaye et al. | 296/146.9 |
| 6,487,820 B1 | * | 12/2002 | Nakajima et al. | 49/490.1 |

FOREIGN PATENT DOCUMENTS

| | | |
|---|---|---|
| DE | 40 08 111 | 9/1991 |
| DE | 44 32 381 | 9/1994 |
| DE | 196 16 788 | 1/1997 |
| DE | 197 27 010 | 1/1999 |
| DE | 199 25 521 | 6/1999 |
| DE | 199 62 988 | 12/1999 |
| DE | 199 29 872 | 11/2001 |
| EP | 476351 | 8/1991 |
| EP | 0 997 331 | 10/1999 |

* cited by examiner

*Primary Examiner*—Hugh B. Thompson
(74) *Attorney, Agent, or Firm*—Andrus, Sceales, Starke & Sawall, LLP

(57) ABSTRACT

A lightweight door for vehicles comprises a door box having a top portion delimited by inner and outer window gutter profiles. A lightweight window frame is coupled to the door box and is formed of light metal or light metal alloy. The window frame is formed from an extruded bent profile that has a closed hollow chamber and at least one mounting formation. The mounting formation may include a mounting groove or a clip-on strip. The mounting formation continuously follows a length of the profile and is for receiving at least one add-on component. A plastic molded panel module is coupled to the frame. The module has a support surface and outer panels formed as a single piece along the frame adjacent a roof rail and a B-pillar of the motor vehicle.

36 Claims, 4 Drawing Sheets

LIGHTWEIGHT DOOR FOR MOTOR VEHICLES

CROSS REFERENCE TO RELATED APPLICATION

This application claims priority from German Patent Application No. 100 63 459.1, filed Dec. 19, 2000.

BACKGROUND AND SUMMARY

The invention relates to the structure of a lightweight door for motor vehicles, i.e. a body-in-white door which, after the painting process, will be completed with further installed components such as window lifts, interior door panels etc.

The design of doors for motor vehicles is determined by various requirements. These include e.g. static rigidity requirements, dynamic rigidity requirements as well as requirements concerning installation space and the arrangement of installed components. Static rigidity requirements include for example requirements relating to bending and torsion of the window frame, and requirements relating to sagging and application of excessive pressure on the door overall. Dynamic rigidity requirements arise from safety requirements during head-on and side-on crashes and from further requirements concerning passenger protection. Space requirements relate to practicable installation and operation of add-on and functional parts in or on the door; maintaining clearance spaces for installation work; maintaining minimum clearances to movable components; maintaining spaces between parallel areas, in particular for sealing purposes; separating the interior space of the door into dry areas and wet areas, etc.

In principle, the above-mentioned requirements for motor vehicle doors apply irrespective as to the particular design type of a motor vehicle door.

Up to now, steel sheet has been the most widely used raw material for motor vehicle doors. The conventional technique of a fully pressed door in shell technology is known. Such a door comprises two pressed shells which are interconnected and also connected to a glass channel frame. Later on, components are installed on the inner shell.

The frame door represents a further conventional door concept. The frame door comprises a window frame made from steel, said window frame comprising a rolled profile bent by stretching and rolling, which window frame is welded or screwed to a door box. The door box in turn comprises two pressed steel shells which are interconnected.

From the point of view of forming variants, a frame door comprising a window frame welded in the door box (modular system door) is advantageous. Such a steel door for motor vehicles is for example known from EP 0 476 351 A1. With this design type, some identical components can be used for different vehicle types.

It has been shown that the previously explained modular system door can also be produced from light metal/light metal alloys, in particular from aluminium alloys. A respective example, which represents the nearest state of the art, has been described in DE 196 16 788 A1. The lightweight door for motor vehicles described in the above mentioned patent specification comprises an outer skin of the door and a supporting frame, with the supporting frame comprising a hinge support forming one U-limb, a lock support forming the other U-limb, and a door bottom forming the U-stay. The hinge support and the lock support are cast parts made from a light metal alloy, in particular from an aluminium alloy, while the door bottom which connects them is an extruded profile, pressed profile or rolled profile made from a light metal alloy, in particular from an aluminium alloy. The supporting frame is closed off at the open top of the U by outer and inner window gutter profiles which can also be extruded aluminium profiles. Window channel profiles and hinge reinforcements complete the frame structure of this lightweight door. Designing the hinge support and the lock support as light metal cast parts makes it possible to achieve complex shapes, but is expensive.

In the above mentioned lightweight door which is known from the state of the art, the window frame which encompasses the window area and which is permanently connected to the door box, can be an extruded and bent light metal profile, in particular a light metal profile bent by stretching and rolling (see also DE 40 08 111 A1). This window frame which initially does not comprise any trim or moulding, will need to accommodate various add-on components. This includes seals as well as an inner roof rail panel which is attached using clips or clip-on fasteners (which require drill holes). This also includes a frame panel to be fitted externally, as well as a panel for the B-pillar.

The use of a multitude of add-on components on and around the window area of a vehicle door requires considerable installation effort. The various add-on components must be adjusted in relation to each other and carefully installed. Of course the tolerances of individual parts can add up, occasionally leading to unsightly large gaps.

It is thus the object of the invention, from the point of view of window frame design, to optimise the previously explained lightweight door for motor vehicles The lightweight door for motor vehicles, according to the invention, meets the above-mentioned objective with the characteristics set forth herein. In this way, from the point of view of construction, the necessary add-on options on the window frame are provided.

According to the preferred embodiment of the invention, the light metal profile forming the window frame comprises at least one continuous acceptance groove and/or a continuous clip-on strip, so that add-on components can be accepted, fixed or attached at said location. For several add-on components, several such devices can be provided or it is possible to provide one such device for attachment or partial attachment of several add-on components.

Preferred embodiments and improvements of the basic teaching of the invention are provided as set forth herein.

BRIEF DESCRIPTION OF THE DRAWINGS

Below, the invention is explained in more detail by means of a drawing which shows just one example of an embodiment, as follows.

DETAILED DESCRIPTION

The above patent application is to be seen in the context of a concurrently submitted patent application relating to the construction of a lightweight door overall, in particular in the region of the door box, namely commonly owned co-pending U.S. patent application Ser. No. 10/024,746, Attorney Docket No. 4680-00001, filed on even date herewith, incorporated herein by reference.

Figure 1:
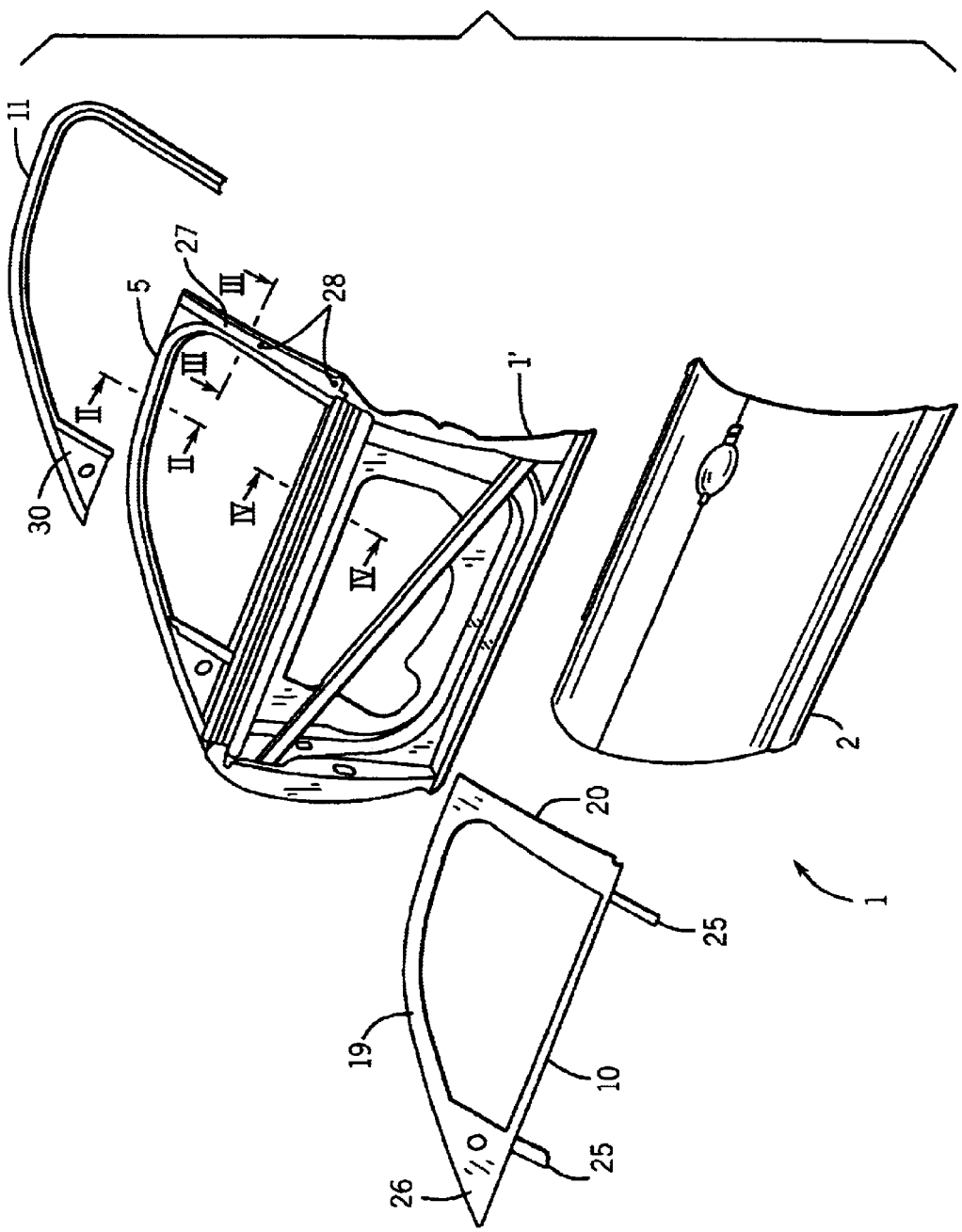
FIG. 1 an exploded view of a lightweight door according to the invention, in a version of a front side door, with the door box with installed window frame already completed.
Figure 4:
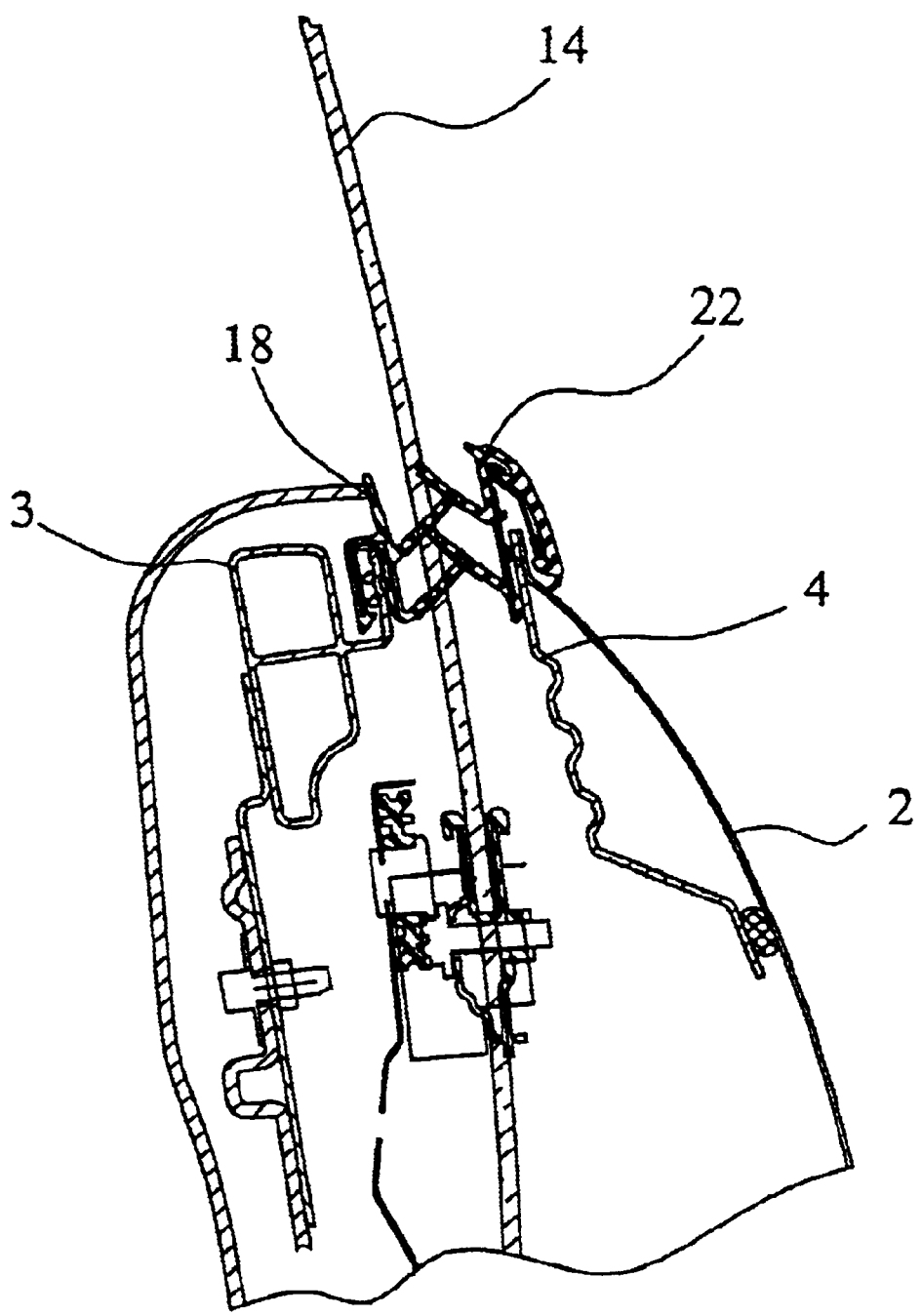
FIG. 4 a section shown in FIG. 1, along the line IV—IV.

As an example of a lightweight door for a motor vehicle, FIG. 1 shows a front side door, namely the passenger door. This lightweight door for motor vehicles comprises a door box 1. As far as this door box 1 is concerned, in the context of the teaching of the present patent application, it is only important that said door box 1 towards the top towards the window area is delimited by inner and outer window gutter profiles 3, 4 (FIG. 4). In principle, door boxes 1 of any design type can be considered for the present teaching. In the context of the embodiment explained, the door box 1 shown, which insofar is the preferred door box, relates to a particularly lightweight construction comprising an essentially U-shaped supporting frame 1' with hinge supports, lock support, door bottom and part of the inside skin of the door. The parallel patent application relates to the design of this supporting frame 1' as a single-piece pressed part or deep-drawn part, made of sheet metal of minimal thickness, made of light metal/light metal alloys. The outer skin of the door 2 is attached to said supporting frame 1'.

The lightweight door is completed by a window frame 5 made of light metal/light metal alloys, in particular aluminium/aluminium alloys, said window frame 5 surrounding the window area, being permanently connected, namely in particular welded, to the door box 1, in particular to the inner window gutter profile 3 of said door box 1. In FIG. 1, the window frame 5 is already permanently attached to the door box 1, thus, together with the door box 1, jointly forming the body-in-white of the lightweight door, with all other components being attached to said body-in-white.

The window frame 5 is an extruded light metal profile which is bent, in particular bent by stretching and rolling. Preferably the window frame 5 is a continuous profile but it can also be composed of two profile sections. For example, two bent extruded sections comprising mitre cuts can be made to join and can be welded together in the top corner facing the B-pillar. This may for example occasionally be required if design requirements call for a corner which is very pronounced at that point.

Figure 2:
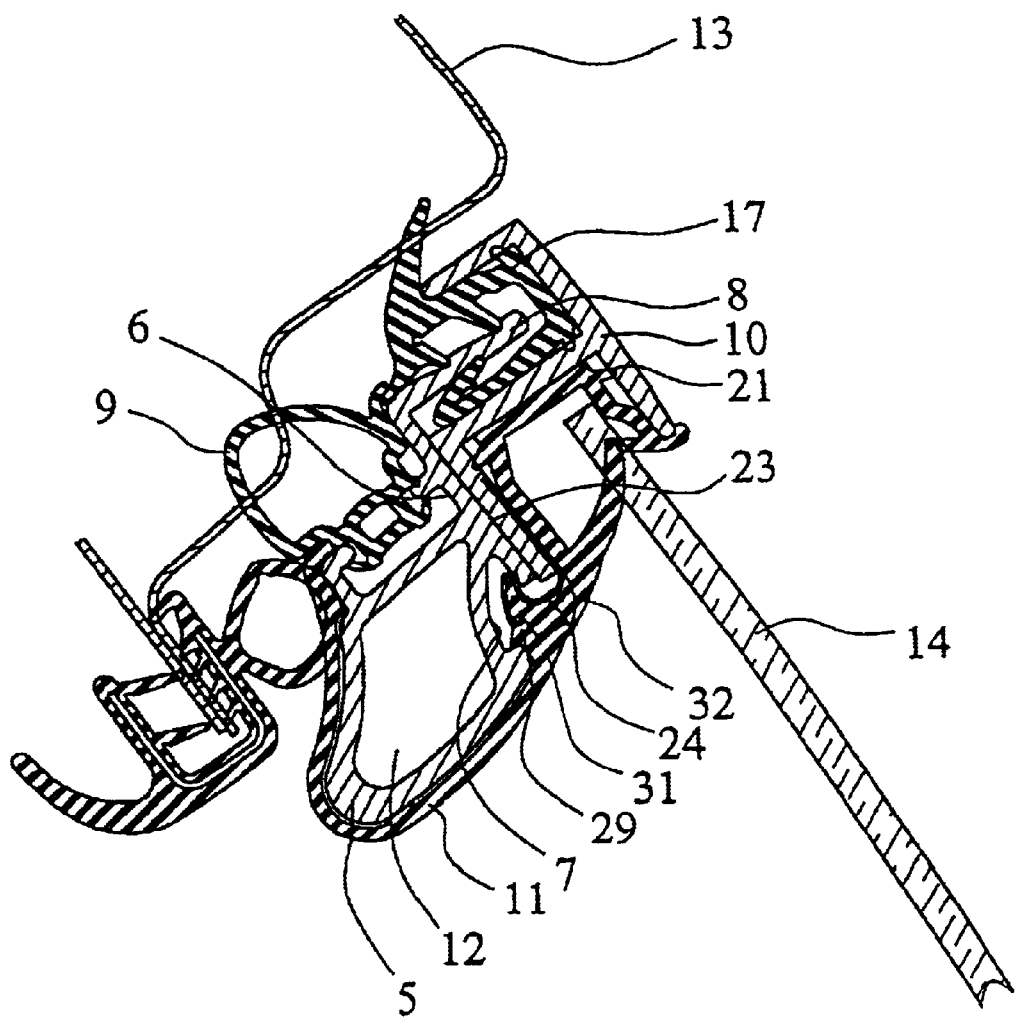
FIG. 2 a section shown in FIG. 1, along the line II—II.
Figure 3:
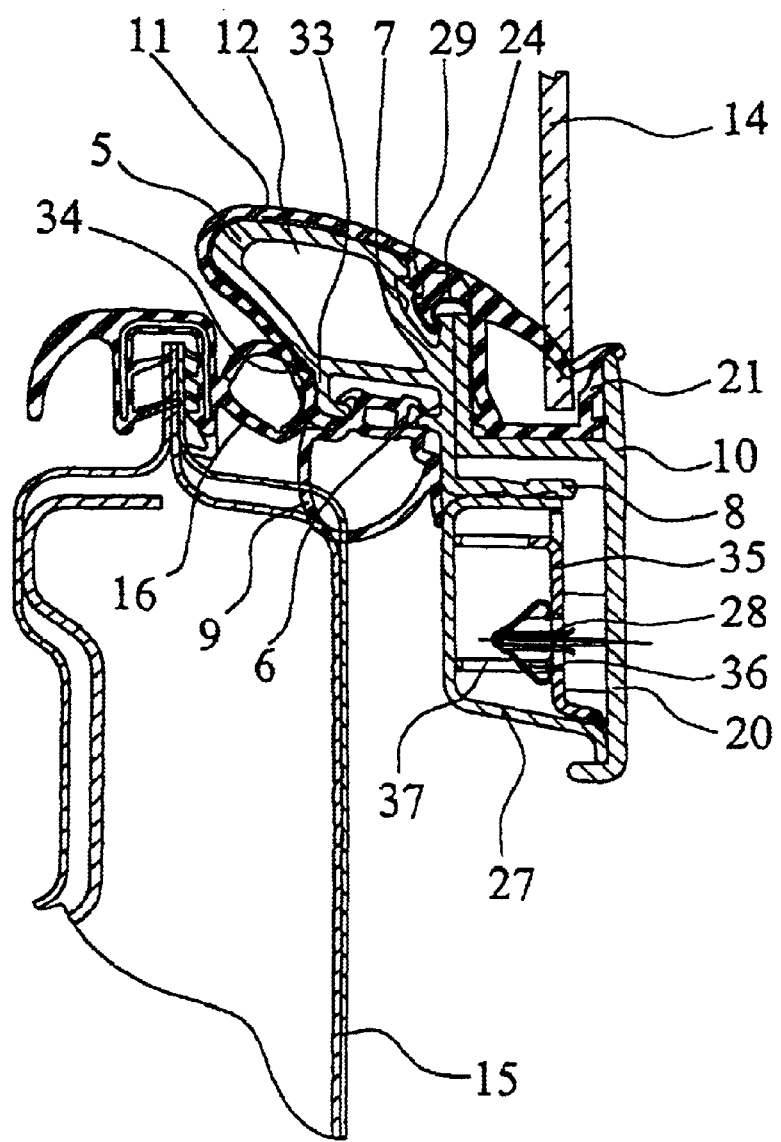
FIG. 3 a section shown in FIG. 1, along the line III—III.

The cross section of the window frame 5 is clearly shown in FIGS. 2 and 3. FIG. 1 shows the position of the sections according to FIGS. 2 and 3. It is shown that the cross section of the extruded light metal profile which constitutes the window frame 5, remains the same along its entire length. The longitudinal contour comprises changes in cross section only to the extent that such changes are the result of further processing steps, for example making releases after bending.

It is essential in the preferred embodiment that the light metal profile which constitutes the window frame 5 comprises at least one acceptance groove 6; 7 which follows the profile and is essentially continuous; and/or comprises at least one clip-on strip 8 which follows the profile and is essentially continuous; with said acceptance groove(s) 6; 7 and clip-on strip 8 essentially being used for accommodation, affixation or attachment of an add-on component 9; 10; 11; 27.

The acceptance grooves 6; 7 and the clip-on strip 8 at the window frame 5 provide the conditions for making possible quick and easy attachment to the window frame 5 of the necessary add-on components without any further drill holes or similar. This will be discussed in more detail later.

The light metal profile shown creates the necessary torsional rigidity of the window frame 5 by means of a closed hollow chamber 12 which on the outside comprises the acceptance groove 6;7 and/or the clip-on strip 8.

The embodiment shown, which is the preferred embodiment, depicts the following: in FIG. 2 the door frame 13 in the roof region as well as a window glass 14; in FIG. 3 the B-pillar 15 of the motor vehicle body with a seal 16 in place on the body side, as well as the window glass 14. FIGS. 2 and 3 show that a first T-shaped acceptance groove 6 has been provided for attachment of a main seal 9 on the door side, as a first add-on component. The seals are always shown in their relaxed position, thus they are brought to the elastically deformed sealing state by the facing sealing surface which is also shown in the drawings. This explanation will help understand the drawings.

A further T-shaped acceptance groove 7 at the window frame 5 is used for affixing attachment elements of add-on components 10; 11 which will be explained in detail later on. In the embodiment shown, this second acceptance groove 7 is arranged diagonally opposite the first acceptance groove 6 at the hollow chamber profile 12 of the light metal profile.

FIG. 2 further shows that in the embodiment shown, which is the preferred embodiment, an additional seal 17 has been placed on the existing clip-on strip 8, with said additional seal 17 preventing the occurrence of wind noise as well as water entry in the region of the roof rail 13.

The embodiment of a light metal profile constituting the window frame 5, which is the preferred embodiment, shows the clip-on strip 8 approximately angled at a right angle from the acceptance groove 6 for the main seal 9, thus resulting in an advantageous free space for arranging the main seal 9 as well as the additional seal 17.

FIG. 3 also shows that the clip-on strip 8 in this region, i.e. on the B-pillar 15, does not carry the seal 17 but is used for another purpose which will be explained later on.

In conjunction with FIGS. 2 and 3, FIG. 1 also shows that the teaching of the invention can be perfected with a particular further measure, namely in that a panel module 10, which is a plastic moulded part, in particular a plastic injection moulded part, is attached to the window frame 5 from the outside as an add-on component, and in that in the panel module 10 the outer panels 19; 20 have been designed as a single piece on the roof rail 13 and on the B-pillar 15, and in that the panel module 10 comprises at least one window channel seal 21. Both figures show the window channel seal 21 for guiding the window glass 14 embedded in a respective acceptance device of the panel module 10.

FIG. 4 shows that in the embodiment shown, the outer window gutter seal 22 is also attached to the panel module 10. Furthermore it shows an inner window gutter seal 18 which is attached to the inner window gutter profile 3.

FIGS. 2 and 3 show that the cross section of the panel module 10, in any case at its encompassing margin area, is designed as a U-profile with connected L-profile. The U-profile constitutes the acceptance device for the window channel seal 21, while the L-profile constitutes the acceptance device, in the roof region, for the additional seal 17 on the clip-on strip 8 of the window frame 5. In this way, by means of the additional L-profile which by means of the stay of the U-profile has again been completed to form a U-profile, attachment of the panel module 10 has been ensured by clipping it on in the roof area.

For attachment of the panel module 10, it is further provided for said panel module 10, for attachment to the window frame 5, to comprise a support surface 23 which rests against a bearing surface of the light metal profile forming the window frame 5; said panel module 10 being attached to the acceptance groove 7 of the light metal profile by means of a multitude of tension clamps 24, spaced apart from each other. It is provided for the tension clamps 24 to be metal spring clamps. FIG. 2 shows these metal spring clamps 24 particularly well.

FIG. 1 also shows that the panel module 10 comprises extensions of the window channels 25, which extensions can be clipped into the door box 1 and which are anchored to the door box 1.

In the embodiment shown, a mirror triangle 26 is also integrated in the panel module 10.

Incorporating a number of panels 19; 20; 26 and seals 21; 22 in the panel module 10 eliminates a great many problems which are associated with the state of the art where a large number of parts have to be attached. Thus the panel module 10, which as a rule is made from plastic, can simply be inserted in the door box with the extensions of the window channels 25, pre-fixed by clipping it onto the clip-on strip 8, and finally-fixed on the light metal profile which constitutes the window frame 5, by means of the tension clamps 24.

Furthermore the embodiment depicted shows a particular design of the window frame 5 (shown in particular in FIGS. 1 and 3) in that the window frame 5 on the side facing the B-pillar 15 of the motor vehicle body, is reinforced by an elongated frame reinforcement part 27. The embodiment shown provides for the frame reinforcement part 27 to be a pressed part or deep-drawn part made from light metal/light metal alloys, in particular from aluminium/aluminium alloys, and permanently connected to the window frame 5 by welding. As shown in FIG. 3 the clip-on strip 8 of the window frame 5 in the region of the B-pillar 15, is used to make this connection. It provides the opportunity to place respective weld seams or rows of weld points. However, instead of weld connections, other connection methods such as screwing, riveting, bonding can be used in this position; however, weld connections will normally be used.

FIG. 3 further shows one embodiment of attaching the panel module 10 in the area of the B-pillar 15 wherein the panel module 10 is attached to the frame reinforcement part 27 of the window frame 5 by means of several clip connections 28. Apart from this, attachment of the panel module 10 to the frame reinforcement part 27 requires closer attention in this embodiment. In this position, the frame reinforcement part 27 has been supplemented and strengthened by an insert component 35 which incorporates the apertures 36 in which the clip connections 28 can be anchored. In the present embodiment, in total three such apertures 36 for three clip connections 28 can be provided along the height of the frame reinforcement part 27. The insert component 35 is welded into the frame reinforcement part 27 which is U-shaped for this purpose. Supports 37 reaching all the way down, provide secure accommodation for positioning when making the weld connection.

The design of the panel module 10 shown depicts various contours in different sections of the window frame 5, so that the use of plastic injection moulded parts made of weather-resistant and deformation-resistant plastic, as is typical in motor vehicle building, is recommended for producing the panel module 10.

Moreover, a further embodiment of the lightweight door according to the invention is characterised in that by way of an add-on component a roof rail panel 11, which is a moulded plastic part, in particular an injection moulded plastic part, is attached to the window frame 5 from the inside, such that the metal surface of the light metal profile constituting the window frame 5 is covered, fitting closely. FIG. 1 indicates attachment of the roof rail panel 11 as a further add-on component, from the inside, to the window frame 5. FIGS. 2 and 3 show details of the roof rail panel 11. Use of the inherent elasticity of the roof rail panel 11, which is a moulded plastic part, in conjunction with the implemented back-hooking technique, provides for the roof rail panel 11 to encompass the light metal profile constituting the window frame 5 in a curved shape using inherent elasticity; and for said roof rail panel 11 to be attached in the acceptance groove 7 on one border by means of a hook-type strip 29, present in said location, or by means of a number of detent hooks spaced apart, present in said location. The drawing shows how the roof rail panel 11 closely follows the free areas of the light metal profile which forms the window frame 5, thus providing optimal cover of the metal areas of the window frame 5 inwards towards the interior space of the motor vehicle. To further affix the roof rail panel 11 to the window frame 5, the roof rail panel 11 encompasses an opposite border of the acceptance groove 6 in a hook-like way. This is shown particularly clearly in FIGS. 2 and 3. In this location, said border of the roof rail panel 11 is covered by the main seal 9 which is seated in the acceptance groove 6, thus being additionally held in place.

FIG. 1 shows that in the embodiment shown, a cover 30 for the mirror triangle 26 is integrated in the roof rail panel 11.

Furthermore FIGS. 2 and 3 illustrate one special feature of the embodiment shown, said special feature being characterised in that the window channel seal 21 comprises a lip 32 which covers the acceptance groove 7, said lip gradually making a transition in shape to a transition strip 31 formed on the roof rail panel 11.

Of particular interest is the proper dimensioning of the acceptance groove 7; in the embodiment shown this is the second acceptance groove 7 beside acceptance groove 6 for the main seal 9. The acceptance groove 7 is dimensioned such that the detent strip 29 of the roof rail panel 11 secures the tension clamps 24 of the panel module 10 in the acceptance groove 7 against falling out. In reality, the two elements mutually secure each other against sliding out of the acceptance groove 7. The entire attachment area is covered by the lip 32 on the window channel seal 21.

FIG. 3 shows the region of the window frame 5 at the B-pillar 15 with the B-pillar panel 20. At the location where the window frame 5 faces the interior of the motor vehicle body shell, there is a border 33 which forms the acceptance groove 6. This border 33, as is the case with the opposite border in the door box 1, is located in a position where retention of the main seal 9 is no longer required, but where a lock facing is to be arranged with a close fit. At this position, feed-in of the window frame 5 to the piece of sheet metal of the lock carrier is to take place. From here the rim 33 and the clip-on strip 8 need to be released. To this effect, the preferred teaching provides for this border 33 to be recessed from the adjacent edge 34 of the light metal profile which forms the window frame 5, with said edge 34 being rounded at a radius suitable for the wall thickness of the profile material. This is in particular clearly shown in FIG. 3. If the border 33 is released in this position, practically no ridge occurs. In any case, any ridge is recessed from the edge 34 and thus does not impede close and optimal fit of the lock facing or the interior wall of the door in the region of the edge 34.

FIG. 1 shows a preferred production method for a lightweight door according to the invention. Said production method is characterised in that, with the window frame 5 already permanently attached to the door box 1, in a first step of the method the main seal 9 is attached to the door box 1 and to the window frame 5; in a second step of the method the roof rail panel 11 is attached to the window frame 5 and clipped into place; in a third step of the method the panel module 10 is inserted into the door box 1; and in a fourth step of the method, with the roof rail panel 11 already in place and attached, the panel module 10 is clamped to the window frame 5, with tension clamps 24 being used in the acceptance groove 7, and clip connections 28 being used on the frame reinforcement part 27.

What is claimed is:

1. A lightweight door for vehicles, the door comprising:
    a door box, the door box having a top portion delimited by inner and outer window gutter profiles;
    a lightweight window frame coupled to the door box, the frame formed of metal selected from the group consisting of light metal and light metal alloy;
    the window frame formed from an extruded bent profile, the profile comprising an inside comprising a closed hollow chamber and an outside comprising at least one mounting formation selected from the group consisting of a mounting groove and a clip-on strip, the at least one mounting formation continuously following a length of the profile and capable of receiving at least one add-on component;
    a window area encompassed by the window frame and the top portion of the door box; and
    a plastic molded panel module coupled to the window frame, the module comprising outer panels formed as a single piece along a roof rail and B-pillar of the frame, the module further comprising at least one window channel seal.

2. The lightweight door of claim 1, wherein the door box comprises a substantially U-shaped supporting frame.

3. The lightweight door of claim 2, wherein the supporting frame is formed of a part selected from the group consisting of a pressed part and a deep-drawn part, the part comprising sheet metal selected from the group consisting of light metal and light metal alloy.

4. The lightweight door of claim 1, wherein the at least one mounting groove comprises a first T-shaped acceptance groove, the groove formed for attachment of a main seal on a door side of the window frame.

5. The lightweight door of claim 4, wherein the at least one mounting groove further comprises a second T-shaped acceptance groove, the groove provided for attachment of the panel module and a roof rail panel.

6. The lightweight door of claim 5, wherein the second acceptance groove is arranged diagonally opposite the first acceptance groove.

7. The lightweight door of claim 4 wherein the clip-on strip protrudes from the profile at a right angle relative to the bearing surface.

8. The lightweight door of claim 1, wherein the at least one mounting groove comprises a second T-shaped acceptance groove, the groove provided for attachment of the panel module and a roof rail panel.

9. The lightweight door of claim 1, further comprising an additional seal, the seal clipped onto the clip-on strip.

10. The lightweight door of claim 1, further comprising an outer window gutter seal coupled to the panel module.

11. The lightweight door of claim 10, wherein the panel module comprises a U-profile cross-section constituting an acceptance device for a window channel seal and an L-profile cross-section constituting a connection device for an additional seal on the clip-on strip of the window frame.

12. The lightweight door of claim 1, wherein the panel module comprises a U-profile cross-section constituting an acceptance device for a window channel seal and an L-profile cross-section constituting a connection device for an additional seal on the clip-on strip of the window frame.

13. The lightweight door of claim 1, wherein the outside of the window frame profile comprises a bearing surface, the panel module comprises a support surface, adjacent the bearing surface, and the door further comprises at least one tension clamp, the at least one tension clamp coupling the panel module to the at least one mounting groove.

14. The lightweight door of claim 13, the at least one tension clamp comprises a metal spring clamp.

15. The lightweight door of claim 13, further comprising a plastic molded roof rail panel coupled to the mounting formation, the roof rail panel being curved and covering an indoor surface of the outside surface of the profile.

16. The lightweight door of claim 15, further comprising a detent strip, the strip coupling the roof rail panel to the mounting formation, wherein the strip secures tension clamps of the panel module in the acceptance groove.

17. The lightweight door of claim 11, wherein the panel module is clipped onto the clip-on strip by an acceptance device.

18. The lightweight door of claim 17, further comprising a seal, the seal sandwiched between the module and the clip-on strip.

19. The lightweight door of claim 1, wherein the panel module further comprises extensions of window channels for insertion into the door box, the extensions protruding down beyond the window gutter profiles.

20. The lightweight door of claim 1, further module, comprising a mirror triangle, the mirror triangle integrated with the panel module.

21. The lightweight door of claim 1, further comprising a frame reinforcement part, the frame reinforcement part coupled to and reinforcing the B-pillar of the window frame.

22. The lightweight door of claim 21, wherein the frame reinforcement part is selected from the group consisting of a pressed part and a deep drawn part, the reinforcement part being permanently connected to the window frame and comprising metal selected from the group consisting of light metal and light metal alloy.

23. The lightweight door of claim 22, wherein the permanent connection is a weld connection.

24. the lightweight door of claim 21, further comprising at least one clip connection, the clip connection coupling the panel module to the window frame at the reinforcement part.

25. The lightweight door of claim 1, further comprising a plastic molded roof rail panel, the panel coupled to the frame by an add-on component.

26. The lightweight door of claim 25, wherein the outside surface of the profile comprises an indoor surface, the indoor surface covered by the roof rail panel.

27. The lightweight door of claim 25, wherein the outside surface of the profile comprises an indoor surface, wherein the roof rail panel is curved and is coupled to the acceptance groove such that the roof rail panel covers the indoor surface.

28. The lightweight door of claim 27, wherein the acceptance groove comprises an opposite border, and wherein the roof rail panel is curved to encompass the opposite border.

29. The lightweight door of claim 25, further comprising a cover for a mirror triangle, the cover being integrated with the roof rail panel.

30. The lightweight door of claim 25, further comprising a window channel seal, the seal comprising a lip which covers the acceptance groove and dually transitions to form a strip on the roof panel.

31. The lightweight door of claim 25, wherein the molded plastic roof rail is injection molded.

32. The lightweight door of claim 1, wherein the acceptance groove comprises a border, the border recessed from an adjacent edge of the window frame profile, the edge being rounded at a radius suitable for a particular wall thickness of the window frame profile.

33. The lightweight door of claim 1, wherein the light metal is aluminum and the light metal alloy is aluminum alloy.

34. The lightweight door of claim 1, wherein the window frame is permanently connected to the inner window gutter profile of the door box.

35. A lightweight door for vehicles, the door comprising:
- a door box, the door box having a top portion delimited by inner and outer window gutter profiles;
- a lightweight window frame permanently coupled to the door box, the frame formed of metal selected from the group consisting of aluminum and aluminum alloy;
- the window frame formed from an extruded bent profile, the profile comprising an inside comprising a closed hollow chamber and an outside comprising at least one mounting formation selected from the group consisting of a mounting groove and a clip-on strip, the mounting formation continuously following a length of the profile and capable of receiving at least one add-on component;
- a window area encompassed by the window frame and the top portion of the door box;
- a plastic molded panel module coupled to the window frame, the module having outer panels formed as a single piece along a roof rail and a B-pillar of the frame, the module comprising at least one window channel seal;
- a plastic molded roof rail panel, the roof rail panel coupled to the window frame at an indoor surface of the outside of the window frame profile; and
- an elongated frame reinforcement part coupled to and reinforcing the B-pillar of the frame.

36. A lightweight door for vehicles, the door comprising:
- a door box, the door box having a top portion delimited by inner and outer window gutter profiles;
- a lightweight window frame coupled to the door box, the frame formed of metal selected from the group consisting of light metal and light metal alloy;
- the window frame formed from an extruded bent profile, the profile comprising an inside comprising a closed hollow chamber and an outside comprising a bearing surface and at least one mounting formation selected from the group consisting of a mounting groove and a clip-on strip, the at least one mounting formation continuously following a length of the profile and capable of receiving at least one add-on component;
- a window area encompassed by the window frame and the top portion of the door box; and
- a plastic molded panel module coupled to the mounting formation, the module comprising a support surface positioned adjacent the frame bearing surface and outer panels formed as a single piece along a roof rail and a B-pillar of the frame, the module further comprising at least one window channel seal.

* * * * *